US012602981B2

(12) United States Patent
Shiraki et al.

(10) Patent No.: US 12,602,981 B2
(45) Date of Patent: Apr. 14, 2026

(54) ACTION MONITORING SYSTEM AND ACTION MONITORING METHOD

(71) Applicant: FUJI CORPORATION, Chiryu (JP)

(72) Inventors: Shohei Shiraki, Toyota (JP); Koji Kawaguchi, Kasugai (JP)

(73) Assignee: FUJI CORPORATION, Chiryu (JP)

( * ) Notice: Subject to any disclaimer, the term of this patent is extended or adjusted under 35 U.S.C. 154(b) by 108 days.

(21) Appl. No.: 18/697,613

(22) PCT Filed: Oct. 6, 2021

(86) PCT No.: PCT/JP2021/036986
§ 371 (c)(1),
(2) Date: Apr. 1, 2024

(87) PCT Pub. No.: WO2023/058154
PCT Pub. Date: Apr. 13, 2023

(65) Prior Publication Data
US 2025/0285524 A1 Sep. 11, 2025

(51) Int. Cl.
*G08B 21/04* (2006.01)

(52) U.S. Cl.
CPC ..... *G08B 21/0469* (2013.01); *G08B 21/0423* (2013.01)

(58) Field of Classification Search
CPC ........................ G08B 21/0469; G08B 21/0423
See application file for complete search history.

(56) References Cited

U.S. PATENT DOCUMENTS 6,796,799 B1 * 9/2004 Yoshiike ............ G08B 21/0476 434/236
8,009,042 B2 * 8/2011 Steiner ................. H05B 47/115 315/159
9,441,847 B2 * 9/2016 Grohman ................. F24F 11/46
(Continued)

FOREIGN PATENT DOCUMENTS

EP 3 163 545 A1 5/2017
JP 2004-70770 A 3/2004
(Continued)

OTHER PUBLICATIONS

International Search Report Issued Dec. 21, 2021, in PCT/JP2021/036986, filed on Oct. 6, 2021, 2 pages.

*Primary Examiner* — Curtis J King
(74) *Attorney, Agent, or Firm* — Oblon, McClelland, Maier & Neustadt, L.L.P.

(57) ABSTRACT

An action monitoring system is configured to monitor an action of a monitoring target person living in a residence, and includes occupancy sensors, a storage section, and a determination section. The occupancy sensors are provided in places different from each other in the residence. The determination section is configured to store, in the storage section in advance, a specific action defined by at least a reaction order of the multiple occupancy sensors, and store a reaction time as reaction data in the storage section when any of the multiple occupancy sensors reacts. The determination section is further configured to extract a current action based on the reaction data stored in the storage section, and compare the current action with the specific action to determine whether the specific action has been normally performed.

7 Claims, 7 Drawing Sheets

(56) References Cited

U.S. PATENT DOCUMENTS

| | | | | |
|---|---|---|---|---|
| 11,809,480 | B1 * | 11/2023 | Cheng | G06F 16/434 |
| 2003/0058111 | A1 * | 3/2003 | Lee | G08B 13/19641 348/E7.086 |
| 2006/0156209 | A1 * | 7/2006 | Matsuura | H04M 1/72472 714/E11.207 |
| 2008/0025477 | A1 * | 1/2008 | Farhan | G08B 21/0423 379/38 |
| 2009/0259728 | A1 * | 10/2009 | Berisford | G08B 21/0492 709/206 |
| 2012/0299728 | A1 * | 11/2012 | Kirkpatrick | G06Q 10/109 340/541 |
| 2016/0027278 | A1 * | 1/2016 | Mcintosh | G08B 21/0423 715/741 |
| 2016/0171378 | A1 * | 6/2016 | Petersen | G06N 20/00 706/58 |
| 2017/0076576 | A1 * | 3/2017 | Tan | G08B 21/0476 |
| 2017/0140628 | A1 * | 5/2017 | Purdham | G08B 21/0423 |
| 2018/0082562 | A1 * | 3/2018 | Ishida | G08B 21/0423 |
| 2018/0144605 | A1 * | 5/2018 | Kusens | A61B 5/1115 |
| 2018/0277246 | A1 * | 9/2018 | Zhong | A61B 5/4839 |
| 2018/0368684 | A1 * | 12/2018 | Schmouker | A61B 5/0022 |
| 2019/0083005 | A1 * | 3/2019 | Aarts | G08B 21/0469 |
| 2019/0103005 | A1 * | 4/2019 | Gilberton | G10L 21/0224 |
| 2019/0122522 | A1 * | 4/2019 | Stefanski | G08B 21/0423 |
| 2019/0357857 | A1 * | 11/2019 | Tanaka | A61B 5/7275 |
| 2019/0378034 | A1 * | 12/2019 | Mowrer | H04N 21/6582 |
| 2021/0057093 | A1 * | 2/2021 | deSa | G08B 21/0423 |
| 2021/0081844 | A1 * | 3/2021 | Bhattacharya | G16Y 10/60 |
| 2021/0200753 | A1 * | 7/2021 | Perelman | G06F 16/248 |
| 2021/0263129 | A1 * | 8/2021 | Pulle | G01S 13/003 |
| 2021/0297167 | A1 * | 9/2021 | Chen | G08B 13/187 |
| 2022/0165144 | A1 * | 5/2022 | De Haes | G08B 17/10 |
| 2022/0230746 | A1 * | 7/2022 | Anthapur | G16H 40/67 |

FOREIGN PATENT DOCUMENTS

| | | |
|---|---|---|
| JP | 2005-115412 A | 4/2005 |
| JP | 2005-157556 A | 6/2005 |
| JP | 2014-106636 A | 6/2014 |

* cited by examiner

Fig. 5
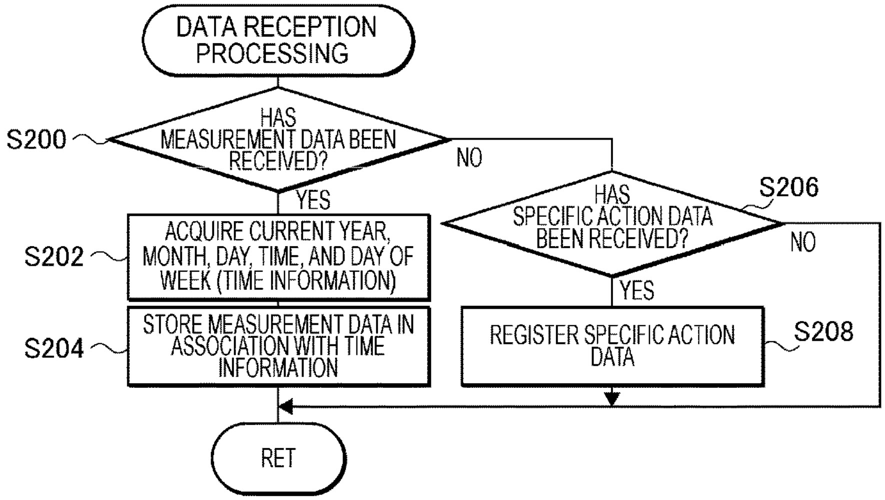
Fig. 6
| ACTION TYPE | TIME SLOT | DAY OF WEEK | MOVEMENT ORDER | REQUIRED TIME |
|---|---|---|---|---|
| DISHWASHING | 18:00–20:00 | — | KITCHEN → DINING ROOM → KITCHEN | 30 MINUTES |
| STROLL | 6:00–8:00 | — | LIVING ROOM → ENTRANCE → ENTRANCE → LIVING ROOM | 60 MINUTES |
| GARBAGE DISPOSAL | 8:00–10:00 | WEDNESDAY, SATURDAY | LIVING ROOM → KITCHEN → ENTRANCE | — |
| ... | ... | ... | ... | ... |
Fig. 7
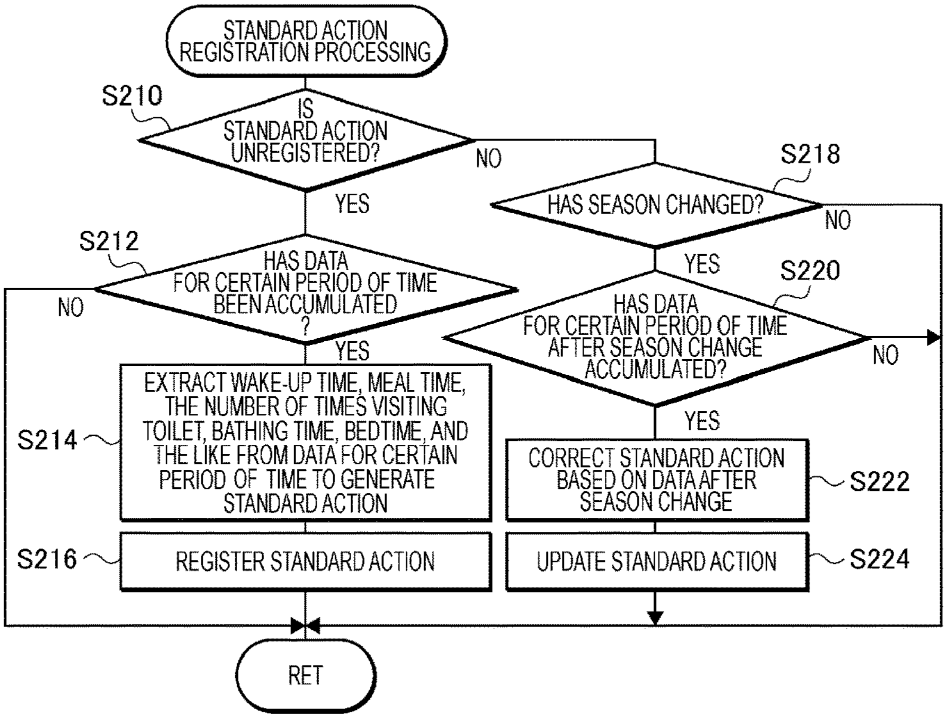

ACTION MONITORING SYSTEM AND ACTION MONITORING METHOD

TECHNICAL FIELD

The present description discloses an action monitoring system and an action monitoring method.

BACKGROUND ART

Conventionally, as this type of action monitoring system, there has been proposed an action monitoring system that collects a daily life pattern of a watching target person using a sensor such as an occupancy sensor installed in a residence and compares the daily life pattern with a current action pattern to obtain a state of the current action pattern (for example, see Patent Literature 1). In this system, as the daily life pattern, a start time, duration, the number of times, and the like of each event such as wake-up, toilet, meal, bathing, and sleep are read from the sensor, a degree of suitability of the lifestyle action based on the read start time, duration, and number of times of occurrence is obtained, and when the degree of suitability is smaller than a predetermined value, it is determined that the life pattern is abnormal. For example, a case where a user is sleeping in a normal meal time, a case where the number of times visiting toilet is small, or a case where a user is sleeping for a long time can be exemplified.

Patent Literature

Patent Literature 1: JP-A-2014-106636

BRIEF SUMMARY

Technical Problem

However, the system described above is limited to a system capable of determining whether an action is normal based on the presence or absence of the target person in one area such as wake-up, toilet, meal, bathing, and sleep, and there is no reference to determining whether an action moving across multiple areas (rooms), such as cleaning or garbage disposal, is normal.

A main object of the present disclosure is to provide an action monitoring system and an action monitoring method capable of appropriately monitoring an action of moving across multiple areas.

Solution to Problem

The present disclosure employs the following means in order to achieve the main object described above.

A gist of an action monitoring system of the present disclosure is an action monitoring system configured to monitor an action of a monitoring target person living in a residence, the action monitoring system including multiple occupancy sensors provided in places different from each other in the residence and configured to detect the monitoring target person, a storage section configured to store data, and a determination section configured to store, in the storage section in advance, a specific action defined by at least a reaction order of the multiple occupancy sensors, store a reaction time as reaction data in the storage section when any of the multiple occupancy sensors reacts, extract a current action based on the reaction data stored in the storage section, and compare the current action with the specific action to determine whether the specific action has been normally performed.

The action monitoring system according to the present disclosure includes the multiple occupancy sensors provided in places different from each other in the residence, a storage section, and a determination section. The determination section stores, in the storage section in advance, the specific action defined by at least the reaction order of the multiple occupancy sensors. The determination section stores reaction time as the reaction data in the storage section when any of the multiple occupancy sensors reacts, extracts the current action based on the reaction data stored in the storage section, and compares the current action with the specific action to determine whether the specific action has been normally performed. By storing the reaction time of each occupancy sensor as the reaction data, it is possible to obtain information on from where and to where the monitoring target person has moved, and to appropriately monitor the action of the monitoring target person who moves across multiple areas.

BRIEF DESCRIPTION OF DRAWINGS

FIG. 5 is a flowchart illustrating an example of data reception processing.

FIG. 6 is a diagram illustrating an example of specific action data.

FIG. 7 is a flowchart illustrating an example of standard action registration processing.

DESCRIPTION OF EMBODIMENTS

Next, an embodiment of the present disclosure will be described with reference to the drawings.

Figure 1:
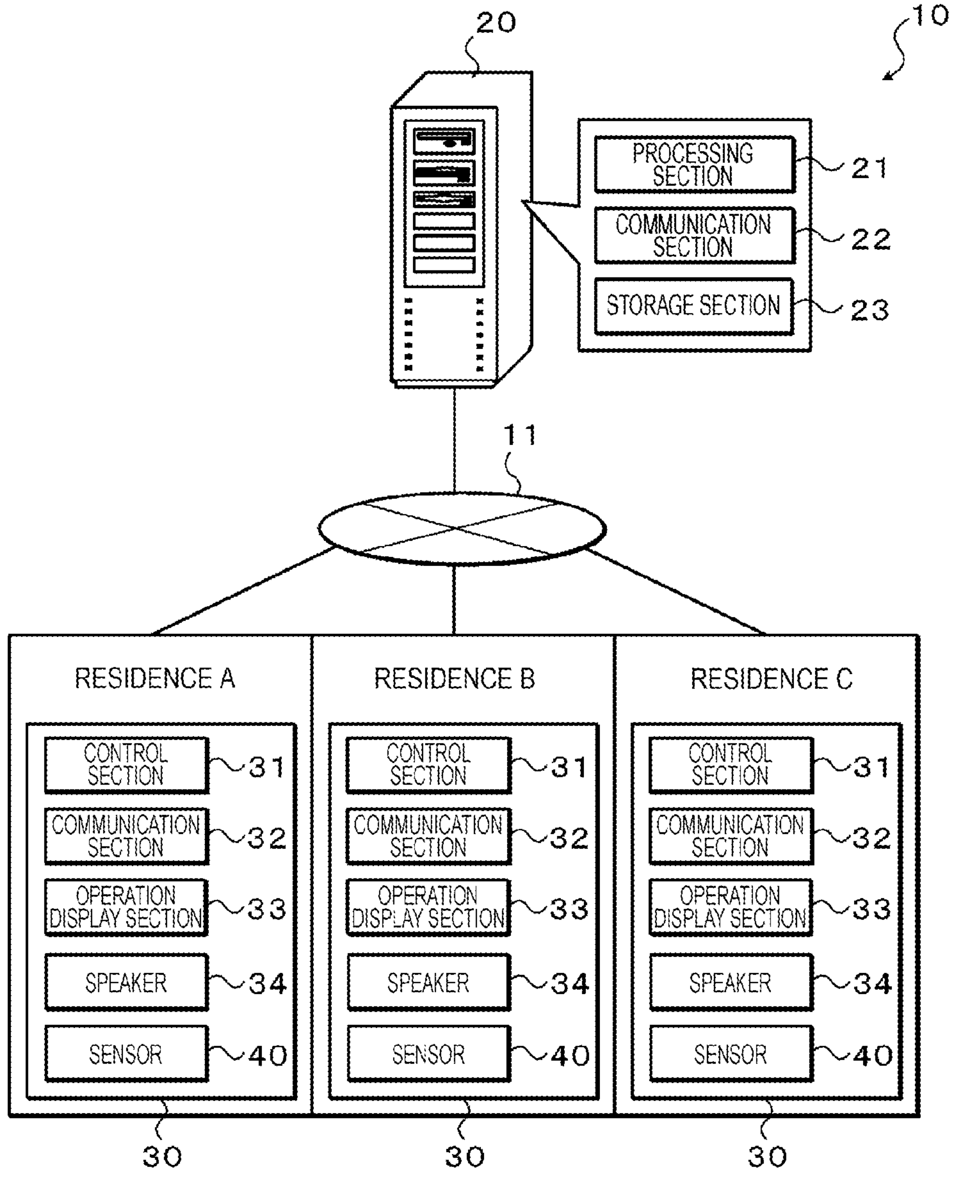
FIG. 1 is a schematic configuration diagram of an action monitoring system according to the present embodiment.
Figure 2:
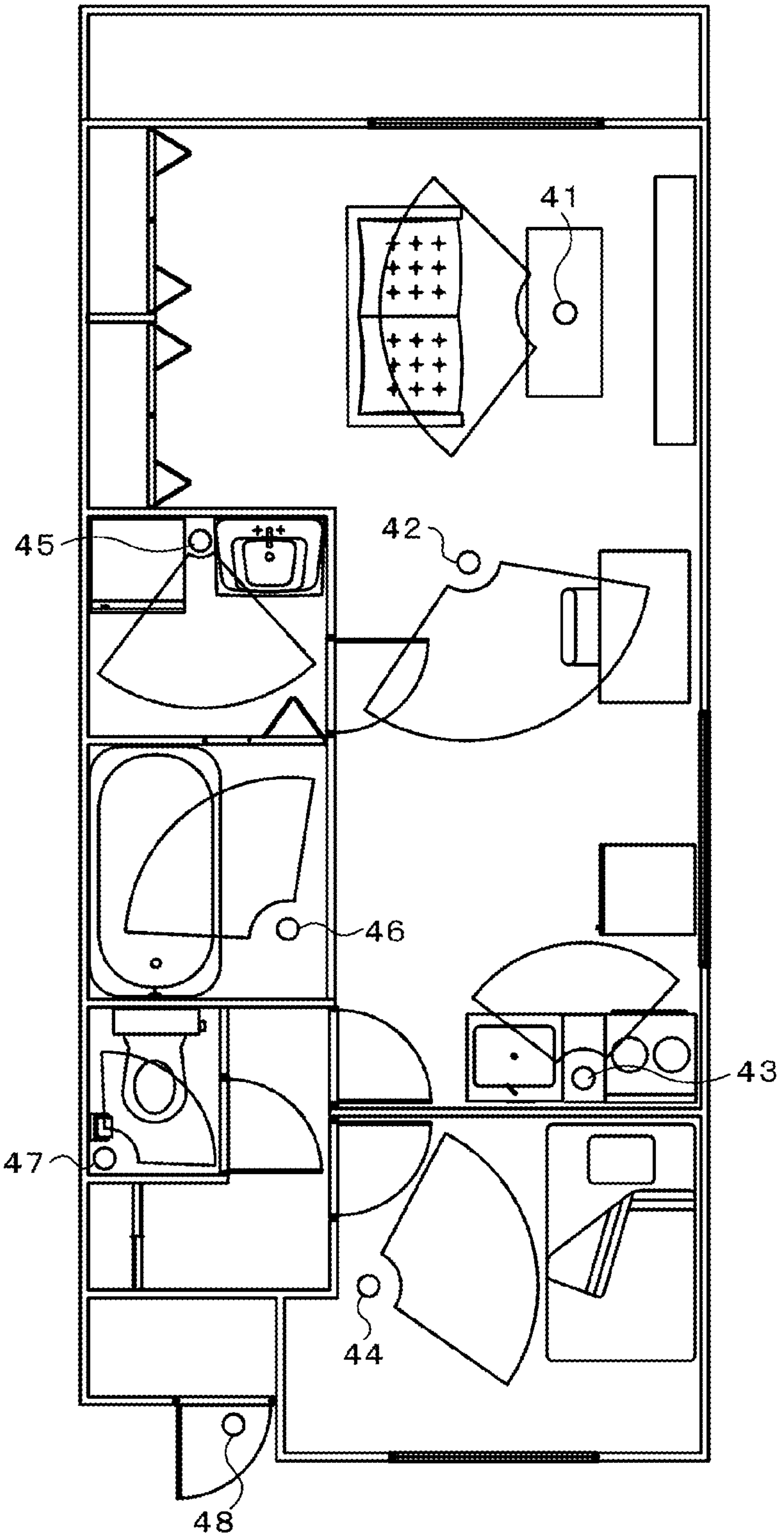
FIG. 2 is a diagram illustrating an example of a sensor installed in each room of a residence.

FIG. 1 is a schematic configuration diagram of action monitoring system 10 of the present embodiment. As illustrated in FIG. 1, action monitoring system 10 of the present embodiment includes management server 20 that manages an entire system, and monitoring device 30 installed in each of residences A to C in which a monitoring target person lives. Residences A to C are residences in which, for example, an elderly person or a person requiring care lives alone, and include, for example, an L (living) D (dining) K (kitchen) room, a bedroom, a washroom, a bathroom, a toilet room, and an entrance as illustrated in FIG. 2. Action monitoring system 10 can be used, for example, to monitor an action of an elderly person or a person requiring care as the monitoring target person in place of a caregiver and to find out an abnormality in the action at an early stage.

Monitoring device 30 includes control section 31, communication section 32, operation display section 33, speaker 34, and sensors 40. Control section 31 is configured as a microprocessor including CPU as a main component, and includes ROM, RAM, and the like in addition to the CPU.

Operation display section 33 and speaker 34 output various information from management server 20 through display or audio. Operation display section 33 is configured as a touch panel type display section with which an operator can perform operation input.

As illustrated in FIG. 2, sensors 40 are sensors for detecting where the monitoring target person who lives in the residence is, and include occupancy sensors 41, 42, 43, 44, 45, 46, and 47 provided in each room, and door sensor 48 provided on an entrance door.

Occupancy sensors 41 to 47 are sensors that detect a person in a detection area in a non-contact manner, and are configured as, for example, infrared sensors that sense an infrared ray and convert the infrared ray into an electric signal. Occupancy sensors 41, 42, and 43 are provided in the living room, dining room, and kitchen of the LDK room, respectively. Occupancy sensor 44 is provided in the bedroom, and occupancy sensor 45 is provided in the washroom. Occupancy sensor 46 is provided in the bathroom, and occupancy sensor 47 is provided in the toilet room.

Door sensor 48 detects opening and closing of the entrance door and is configured as, for example, a magnet-type opening/closing sensor including a permanent magnet fixed to a door side and a magnetic sensor fixed to a frame side.

Management server 20 includes processing section 21, communication section 22, and storage section 23. Processing section 21 is configured as a microprocessor including CPU as a main component, and includes ROM, RAM, and the like in addition to the CPU. Communication section 22 of management server 20 is connected to communication section 32 of each monitoring device 30 via network 11 such as the Internet, and management server 20 and each monitoring device 30 exchange data and a signal with each other via communication sections 22 and 32. Storage section 23 is configured with an HDD, an SSD, or the like, receives data measured by each monitoring device 30, and stores the data for a certain period of time.

Next, an operation of the action monitoring system configured as described above, that is, an operation of each monitoring device 30 and an operation of management server 20 will be described. The operation of each monitoring device 30 includes data measurement processing and specific action registration processing. The operation of management server 20 includes data reception processing, standard action registration processing, standard action determination processing, and specific action determination processing.

Figure 3:
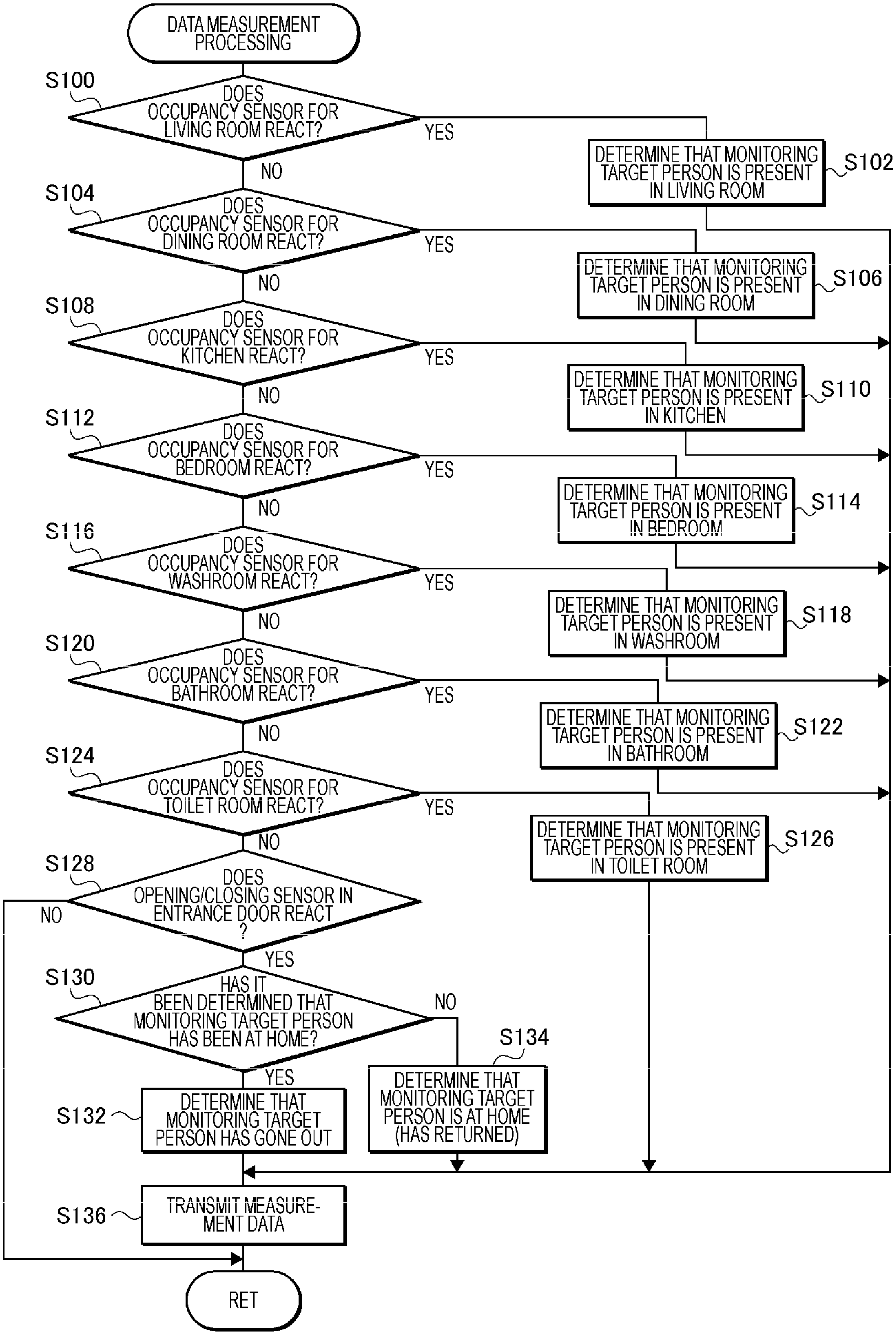
FIG. 3 is a flowchart illustrating an example of data measurement processing.

The data measurement processing is processing of measuring (collecting) a location of the monitoring target person from a sensor provided in each room of the residence. FIG. 3 is a flowchart illustrating an example of data measurement processing executed by control section 31 of each monitoring device 30. This processing is repeatedly executed at a predetermined time interval.

When the data measurement processing is executed, control section 31 of monitoring device 30 first determines whether occupancy sensor 41 for the living room provided in the living room reacts (step S100). When it is determined that occupancy sensor 41 for the living room reacts, control section 31 determines that the monitoring target person is present in the living room (step S102), transmits the determination result as measurement data to management server 20 (step S136), and ends the data measurement processing.

When it is determined in step S100 that occupancy sensor 41 for the living room does not react, control section 31 subsequently determines whether occupancy sensor 42 for the dining room provided in the dining room reacts (step S104). When it is determined that occupancy sensor 41 for the dining room reacts, control section 31 determines that the monitoring target person is present in the dining room (step S106), transmits the determination result as measurement data to management server 20 (step S136), and ends the data measurement processing.

When it is determined in step S104 that occupancy sensor 42 for the dining room does not react, control section 31 subsequently determines whether occupancy sensor 43 for the kitchen provided in the kitchen reacts (step S108). When it is determined that occupancy sensor 43 for the kitchen reacts, control section 31 determines that the monitoring target person is present in the kitchen (step S110), transmits the determination result as measurement data to management server 20 (step S136), and ends the data measurement processing.

When it is determined in step S108 that occupancy sensor 43 for the kitchen does not react, control section 31 subsequently determines whether occupancy sensor 44 for the bedroom provided in the bedroom reacts (step S112). When it is determined that occupancy sensor 44 for the bedroom reacts, control section 31 determines that the monitoring target person is present in the bedroom (step S114), transmits the determination result as measurement data to management server 20 (step S136), and ends the data measurement processing.

When it is determined in step S112 that occupancy sensor 44 for the bedroom does not react, control section 31 subsequently determines whether occupancy sensor 45 for the washroom provided in the washroom reacts (step S116). When it is determined that occupancy sensor 45 for the washroom reacts, control section 31 determines that the monitoring target person is present in the washroom (step S118), transmits the determination result as measurement data to management server 20 (step S136), and ends the data measurement processing.

When it is determined in step S116 that occupancy sensor 45 for the washroom does not react, control section 31 subsequently determines whether occupancy sensor 46 for the bathroom provided in the bathroom reacts (step S120). When it is determined that occupancy sensor 46 for the bathroom reacts, control section 31 determines that the monitoring target person is present in the bathroom (step S122), transmits the determination result as measurement data to management server 20 (step S136), and ends the data measurement processing.

When it is determined in step S120 that occupancy sensor 46 for the bathroom does not react, control section 31 subsequently determines whether occupancy sensor 47 for the toilet room provided in the toilet room reacts (step S124). When it is determined that occupancy sensor 47 for the toilet room reacts, control section 31 determines that the monitoring target person is present in the toilet room (step S126), transmits the determination result as measurement data to management server 20 (step S136), and ends the data measurement processing.

When it is determined in step S124 that occupancy sensor 47 for the toilet room does not react, control section 31 subsequently determines whether door sensor 48 for the entrance provided in the entrance door reacts (step S128). When it is determined that door sensor 48 for the entrance reacts, control section 31 determines whether it has been determined in step S134 described later that the monitoring target person has been at home (step S130). When it is determined that it has been determined that the monitoring target person has been at home, control section 31 determines that the monitoring target person has gone out (step S132), transmits the determination result as measurement data to management server 20 (step S136), and ends the data measurement processing. On the other hand, when it is determined that it has not been determined that the monitoring target person has been at home (it has been determined that the monitoring target person has been out), control section 31 determines that the monitoring target person has returned, that is, is at home (step S134), transmits the determination result as measurement data to management server 20 (step S136), and ends the data measurement processing.

Figure 4:
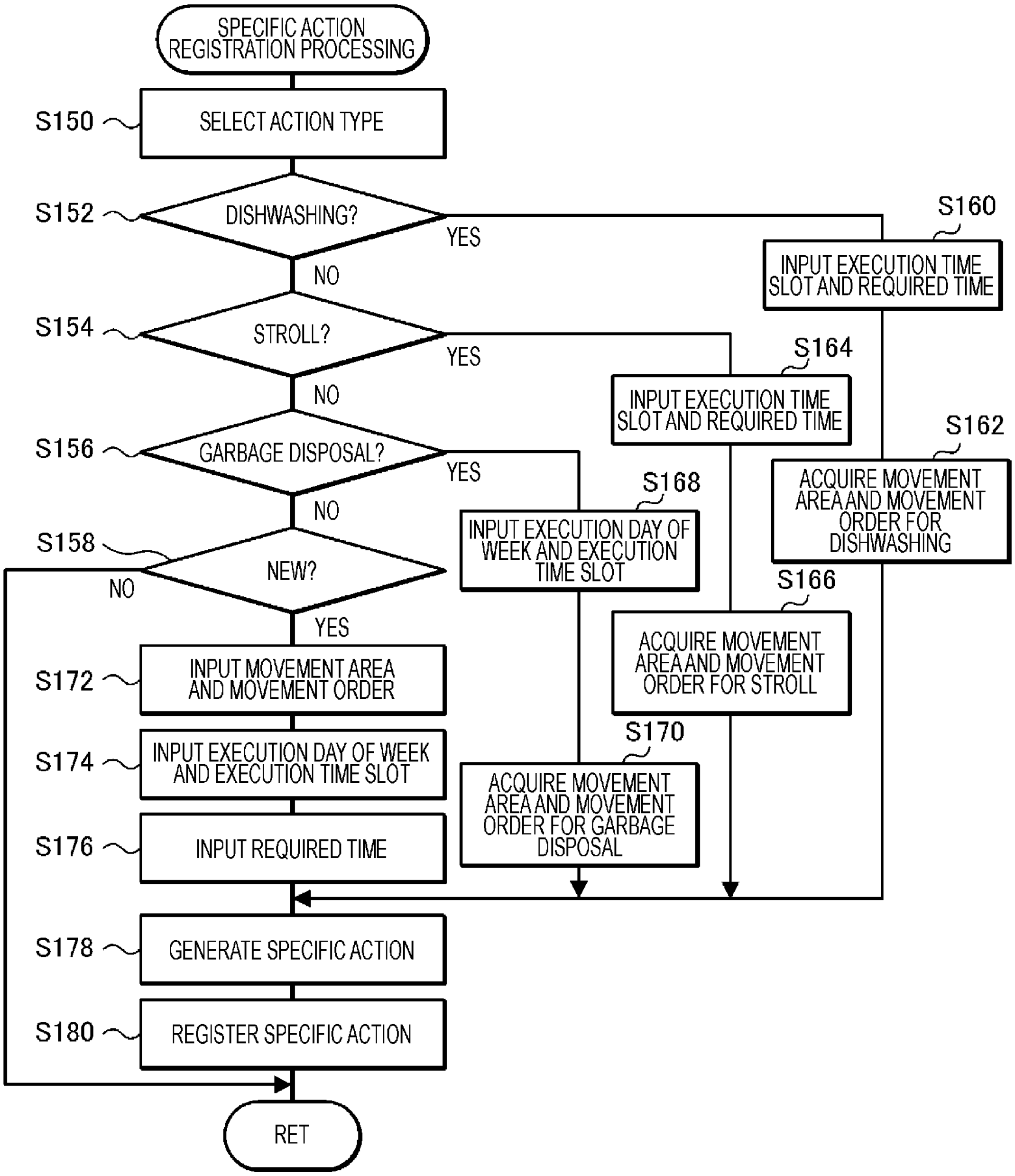
FIG. 4 is a flowchart illustrating an example of specific action registration processing.

The specific action registration processing is processing of registering a periodic schedule (specific action) to be executed by the monitoring target person in advance for schedule management, determination of suitability of the action of the monitoring target person, and the like. FIG. 4 is a flowchart illustrating an example of specific action registration processing executed by control section 31 of monitoring device 30. This processing is repeatedly executed at a predetermined time interval.

When the specific action registration processing is executed, control section 31 first displays a menu screen on operation display section 33 and receives selection of an action type (step S150). Then, control section 31 determines whether "dishwashing" is selected as the action type (step S152), whether "stroll" is selected as the action type (step S154), whether "garbage disposal" is selected as the action type (step S156), and whether "new" for creating a new action type is selected as the action type (step S158).

When it is determined in step S152 that "dishwashing" has been selected, control section 31 receives an input of an execution time slot in which dishwashing is performed and a time required for dishwashing (staying time in the kitchen) (step S160). Subsequently, control section 31 acquires a movement area (room) to which a person performing dishwashing moves and a movement order between the movement areas (step S162). The acquisition of the movement area and the movement order is performed by creating and registering a relationship between the action type and the movement area and movement order in advance and deriving the corresponding movement area and movement order when the action type is given. In the present embodiment, the movement area for dishwashing includes the kitchen and dining room, and the movement order for dishwashing is an order from the kitchen to the dining room, and to the kitchen. Then, control section 31 generates specific action data for dishwashing including the acquired movement area and movement order and the input execution time slot and required time (staying time) (step S178), transmits the generated specific action data to management server 20 in order to register the specific action data in management server 20 (step S180), and ends the specific action registration processing.

When it is determined in step S154 that "stroll" has been selected, control section 31 receives an input of an execution time slot in which a stroll is performed and a required time (outgoing time) (step S164). Subsequently, control section 31 acquires a movement area (room) to which a person strolling moves and a movement order between the movement areas (step S166). In the present embodiment, the movement area for a stroll includes the living room and the entrance, and the movement order for a stroll is an order from the living room to the entrance (going out), to the entrance (returning), and to the living room. Then, control section 31 generates specific action data for a stroll including the acquired movement area and movement order and the input execution time slot and required time (outgoing time) (step S178), transmits the generated specific action data to management server 20 in order to register the specific action data in management server 20 (step S180), and ends the specific action registration processing.

When it is determined in step S156 that "garbage disposal" has been selected, control section 31 receives an input of an execution day of the week and an execution time slot in which garbage disposal is performed (step S168). Subsequently, control section 31 acquires a movement area (room) to which a person performing garbage disposal moves and a movement order between the movement areas (step S170). In the present embodiment, the movement area for garbage disposal includes the living room, the kitchen, and the entrance, and the movement order for garbage disposal is an order from the living room to the kitchen, and to the entrance. Then, control section 31 generates specific action data for garbage disposal including the acquired movement area and movement order and the input execution day of the week and execution time slot (step S178), transmits the generated specific action data to management server 20 in order to register the specific action data in management server 20 (step S180), and ends the specific action registration processing.

When it is determined in step S158 that "new" has been selected, control section 31 receives each of an input of a movement area and a movement order (step S172), an input of an execution day of the week and an execution time slot (step S174), and an input of a required time (step S176). Then, control section 31 generates new specific action data including the input movement area and movement order, the execution day of the week, the execution time slot, and the required time (step S178), transmits the generated specific action data to management server 20 in order to register the specific action data in management server 20 (step S180), and ends the specific action registration processing.

Next, operations (data reception processing, standard action registration processing, standard action determination processing, and specific action determination processing) of management server 20 will be described.

The data reception processing is processing of receiving measurement data transmitted from each monitoring device 30. FIG. 5 is a flowchart illustrating an example of data reception processing executed by processing section 21 of management server 20. This processing is repeatedly executed at a predetermined time interval.

When the data reception processing is executed, processing section 21 of management server 20 first determines whether measurement data has been received from monitoring device 30 (step S200). When it is determined that measurement data has been received, processing section 21 accesses a time server via the Internet to acquire the current year, month, day, time (hour/minute/second), and day of the week as time information (step S202), stores the acquired time information in storage section 23 in association with the measurement data (step S204), and ends the data reception processing. The time information may be acquired by reading the current time from a real-time clock (RTC).

When it is determined in step S200 that the measurement data has not been received, processing section 21 determines whether the specific action data has been received from monitoring device 30 (step S206). When it is determined that the specific action data has not been received, processing section 21 ends the data reception processing. On the other hand, when it is determined that the specific action data has been received, processing section 21 registers the received specific action data in storage section 23 (step S208), and ends the data reception processing. An example of the specific action data is illustrated in FIG. 6. The specific action is performed along with movement across multiple areas (rooms) of the residence, and the specific action data includes the movement order, the execution time slot, the execution day of the week, and the required time as illustrated in FIG. 6. In the present embodiment, depending on a type of the specific action, some information (the execution day of the week and the required time) may be omitted. The specific action data is used in specific action determination processing described later.

FIG. 7 is a flowchart illustrating an example of the standard action registration processing executed by processing section 21 of management server 20. This processing is repeatedly executed at a predetermined time interval. Here, the standard action indicates a daily pattern of basic actions such as wake-up, toilet, meal, bathing, and sleep.

In the standard action registration processing, processing section 21 first determines whether the standard action is unregistered (step S210). When it is determined that the standard action is unregistered, processing section 21 determines whether measurement data for a certain period of time (for example, for one month or one week) has been accumulated in storage section 23 by the above-described data reception processing (step S212). When it is determined that the measurement data for the certain period of time has not been accumulated, processing section 21 determines that a sufficient amount of measurement data for extracting the standard action has not been accumulated, and ends the standard action registration processing. On the other hand, when it is determined that the measurement data for the certain period of time has been accumulated, processing section 21 extracts the standard action including the wake-up time, the meal time, the number of times visiting toilet, the bathing time, the bedtime, and the like from the measurement data for the certain period of time (step S214). For example, the extraction of the wake-up time can be performed by acquiring an exit time when an exit from the bedroom is determined after a stay in the bedroom for a predetermined time or more (a time difference between an entry time and the exit time is a predetermined time or more) is determined based on the measurement data of the bedroom and the time information associated with the measurement data. Extraction of the meal time can be performed by acquiring a stay time when a stay is determined for a predetermined time or more in the dining room after a movement from the kitchen to the dining room is determined based on the measurement data of the kitchen and the dining room and the time information associated with the measurement data. Extraction of the number of times visiting toilet can be performed by counting the number of detections each time an entry into the toilet room is detected based on measurement data of the toilet room and the time information associated with the measurement data. Extraction of the bathing time can be performed by acquiring the staying time (time difference between an entry time and an exit time) of the bathroom based on the measurement data of the bathroom and the time information associated with the measurement data. Extraction of the bedtime can be performed by acquiring an entry time into the bedroom when it is determined that the person stays in the bedroom for a predetermined time or more after the entry into the bedroom is determined based on the measurement data of the bedroom and the time information associated with the measurement data. The extraction of the wake-up time and the bedtime may be performed using a dedicated sleep sensor. When the standard action is extracted in this manner, processing section 21 registers the extracted standard action in storage section 23 (step S216), and ends the standard action registration processing.

When it is determined in step S210 that the standard action has been registered, processing section 21 determines whether a season has changed based on the current year, month, and day (step S218). In the present embodiment, a spring season is March, April, and May, a summer season is June, July, and August, an autumn season is September, October, and November, and a winter season is December, January, and February. When it is determined that the season has changed, processing section 21 determines whether data for a certain period of time after a season change has been accumulated in storage section 23 (step S220). When it is determined that the data for the certain period of time after the season change has been accumulated, processing section 21 corrects the standard action based on the data after the season change (step S222), updates the standard action registered in storage section 23 (step S224), and ends the standard action registration processing. In the present embodiment, by updating the standard action for each season, it is possible to reflect a change in the wake-up time, the bedtime, or the like, which is caused by the change in the season, in the standard action. When it is determined in step S218 that the season has not changed or when it is determined in step S220 that data for the certain period of time after the season change has not yet been accumulated, processing section 21 ends the standard action registration processing without updating the standard action.

Figure 8:
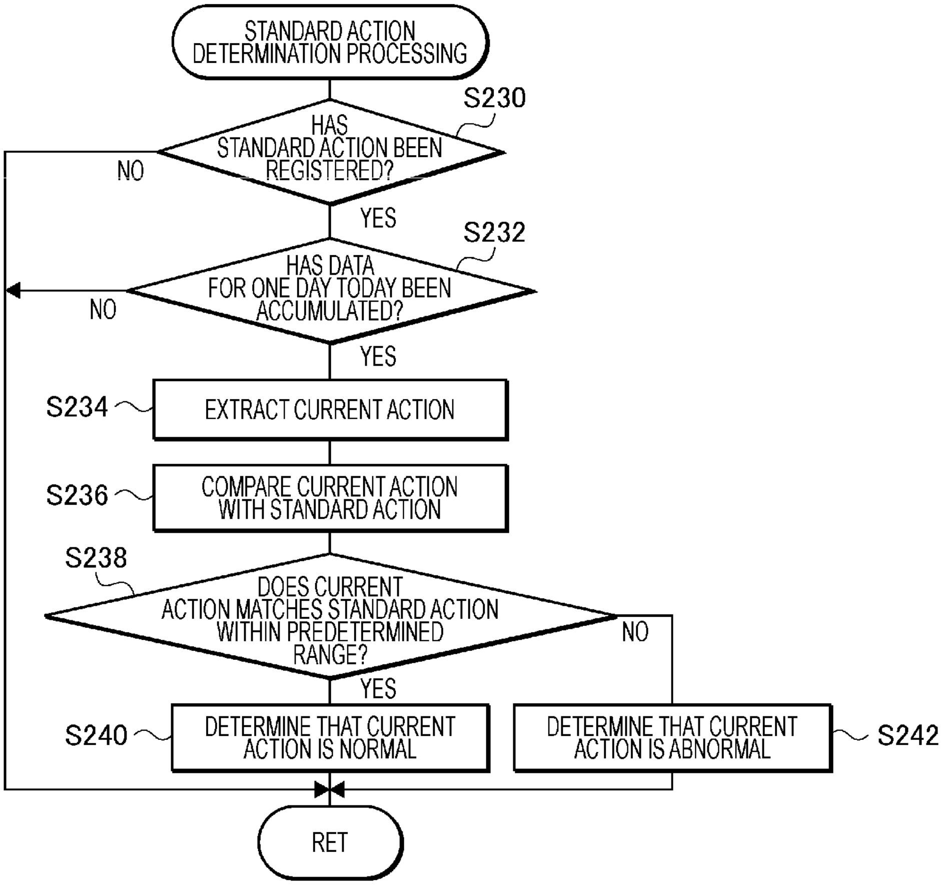
FIG. 8 is a flowchart illustrating an example of standard action determination processing.

FIG. 8 is a flowchart illustrating an example of a standard action determination processing executed by processing section 21 of management server 20. This processing is repeatedly executed at a predetermined time interval.

When the standard action determination processing is executed, processing section 21 first determines whether the standard action has been registered in storage section 23 (step S230) and whether measurement data for one day today has been accumulated in storage section 23 (step S232). When it is determined that the standard action has not been registered or it is determined that the measurement data for one day today has not been accumulated, processing section 21 ends the standard action determination processing. On the other hand, when it is determined that the standard action has been registered and the measurement data for one day today has been accumulated, processing section 21 extracts a current action including the wake-up time, the meal time, the number of times visiting toilet, the bathing time, the bedtime, and the like from the measurement data for one day today (step S234). The current action is extracted from the data for one day today, but may be extracted from data for several days in the past from today.

Next, processing section 21 compares the extracted current action with the standard action registered in storage section 23 (step S236), and determines whether the current action matches the standard action within a predetermined range (step S238). This determination is performed by determining whether a difference between the current action and the standard action (a difference in time or a difference in the number of times) is within an allowable range. When it is determined that the current action matches the standard action within the predetermined range, processing section 21 determines that the current action is normal (step S240), and ends the standard action determination processing. On the other hand, when it is determined that the current action does not match the standard action within the predetermined range, processing section 21 determines that the current action is abnormal (step S242), and ends the standard action determination processing. Accordingly, it is possible to detect a sign of an abnormal change different from the standard action at an early stage, which contributes to early treatment. In addition, since the standard action is appropriately updated based on the action that changes due to a season factor, it is possible to prevent the current action from being erroneously determined to be abnormal.

Figure 9:
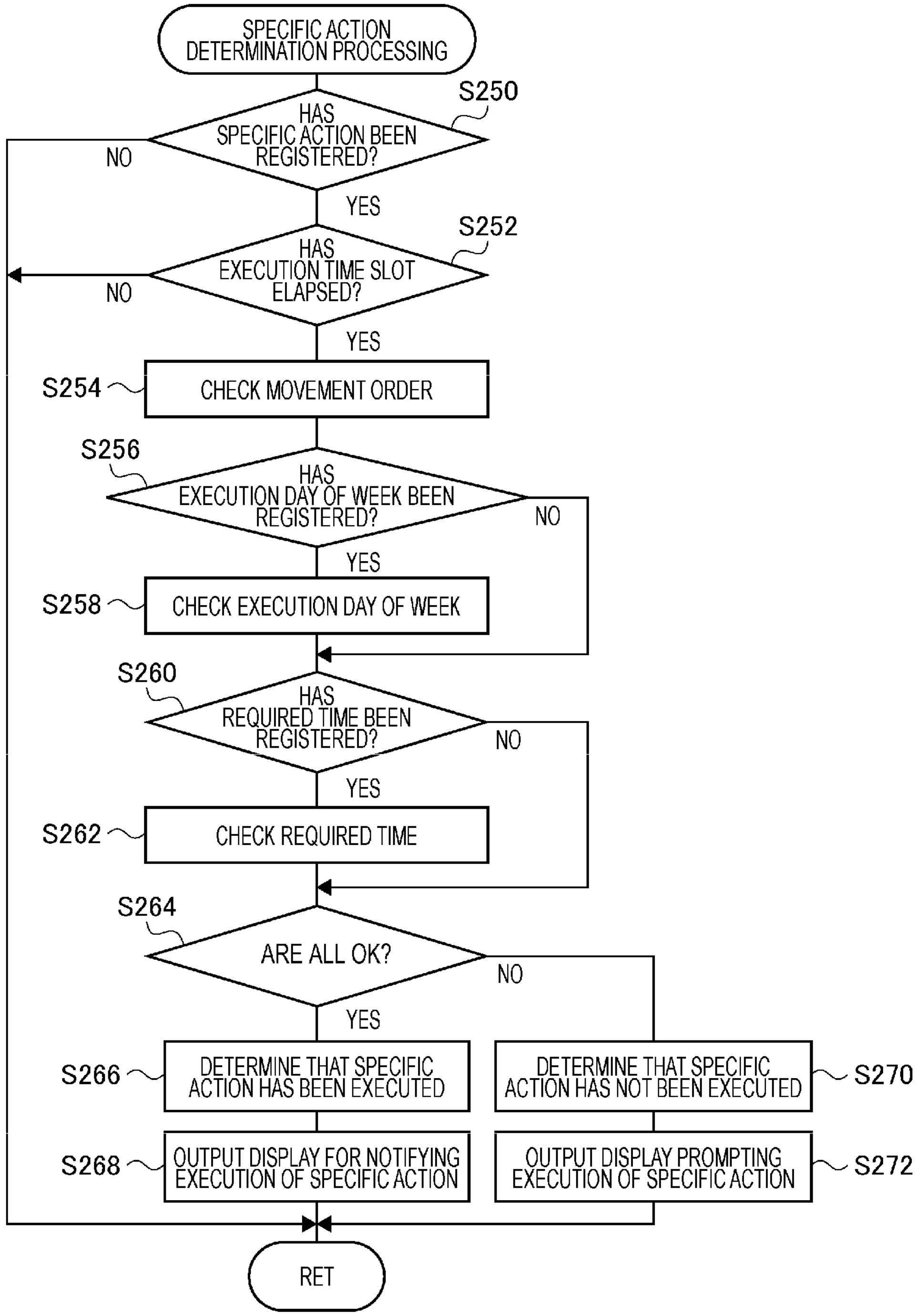
FIG. 9 is a flowchart illustrating an example of specific action determination processing.

FIG. 9 is a flowchart illustrating an example of specific action determination processing executed by processing section 21 of management server 20. This processing is repeatedly executed at a predetermined time interval.

When the specific action determination processing is executed, processing section 21 first determines whether the specific action has been registered in storage section 23 (step S250). When it is determined that the specific action has not been registered, processing section 21 ends the specific action determination processing. On the other hand, when it is determined that the specific action has been registered, processing section 21 determines whether an execution time slot in which a specific action as a determination target among the registered specific actions is to be executed has elapsed (step S252). This determination is performed by determining whether the execution time slot of the execution day of the week has elapsed when the execution day of the week has been determined for the specific action as the determination target. When it is determined that the execution time slot has not elapsed, processing section 21 ends the specific action determination processing.

On the other hand, when it is determined that the execution time slot has elapsed, processing section 21 extracts the movement order of the room (action order) in the execution time slot from the measurement data within the execution time slot stored in storage section 23, and checks whether the extracted movement order matches the movement order of the room (action order) in the specific action as the determination target (step S254). This processing is performed by extracting measurement data (rooms in which the monitoring target person is present) within the execution time slot in time series, and determining whether a data group matching the action order of the specific action as the determination target is included in the extracted measurement data.

Subsequently, processing section 21 determines whether an execution day of the week has been registered in the specific action as the determination target (step S256). When it is determined that the execution day of the week has been registered, processing section 21 checks whether the day of the week today matches the execution day of the week of the specific action as the determination target (step S258). On the other hand, when it is determined that the execution day of the week has not been registered, processing section 21 skips step S258.

Next, processing section 21 determines whether the required time has been registered in the specific action as the determination target (step S260). When it is determined that the required time has been registered, processing section 21 calculates the staying time based on the time information associated with the corresponding measurement data within the execution time slot, and determines whether the calculated execution time and the required time of the specific action as the determination target match within a predetermined range (step S262). This determination is performed, for example, by comparing the staying time in the kitchen with the time required for dishwashing when the specific action as the determination target is dishwashing. In addition, the determination is performed by comparing the outgoing time and the required time of the stroll when the specific action as the determination target is the stroll. On the other hand, when it is determined that the required time has not been registered, processing section 21 skips step S262.

When it is determined that all of the movement order, the execution day of the week, and the required time match the specific action as the determination target ("YES" in step S264), processing section 21 determines that the specific action as the determination target is executed (step S266), transmits the determination result to monitoring device 30 (step S268), and ends the specific action determination processing. Upon receiving the determination result indicating that the specific action has been executed, monitoring device 30 displays information indicating the execution state of the specific action or the like on operation display section 33. Accordingly, it is possible to prompt the monitoring target person to continuously execute the specific action.

On the other hand, when it is determined that any one of the movement order, the execution day of the week, and the required time does not match the specific action as the determination target ("NO" in step S264), processing section 21 determines that the specific action as the determination target has not been executed (step S270), transmits the determination result to monitoring device 30 (step S272), and ends the specific action determination processing. Upon receiving the determination result indicating that the specific action has not been executed, monitoring device 30 displays information indicating that the specific action has not been executed or a message prompting the monitoring target person to execute the specific action on operation display section 33. Accordingly, it is possible to cause the monitoring target person to more reliably execute the specific action.

Note that processing section 21 may totalize the presence or absence of the execution of the specific action for each predetermined period (for example, one month or one week) to calculate an execution rate, and determine that the specific action has not been appropriately executed when the execution rate is smaller than a predetermined value. Thus, the execution state of the specific action can be obtained. In addition, processing section 21 may transmit the determination result to a portable information terminal such as a smartphone registered in advance in order to notify the monitoring target person or a protector of the determination result for the specific action. In addition, the execution time slot, the execution day of the week, and the required time which are different for each timing (for example, for each week, for each month, and for each season) may be registered as the specific action, and it may be determined whether the specific action is executed in the execution day of the week, the execution time slot, and the required time corresponding to the current timing.

Here, a correspondence relationship between main elements of the embodiment will be described. That is, occupancy sensors 41 to 47 of the present embodiment correspond to occupancy sensors of the present disclosure, storage section 23 corresponds to a storage section, and processing section 21 corresponds to a determination section. Operation display section 33 corresponds to a notification section.

It is needless to say that the present disclosure is not limited in any way to the embodiment described above, and the present disclosure can be embodied in various aspects as long as the aspects fall within the technical scope of the present disclosure.

For example, in the above-described embodiment, the specific action is registered in storage section 23 by inputting the action type (movement area and movement order), the execution time slot, the required time (staying time), and the like in advance with operation display section 33. However, similarly to the standard action, processing section 21 may extract the specific action based on the measurement data for the certain period of time that has been acquired from monitoring device 30 and accumulated.

An action monitoring system according to the present disclosure described above includes multiple occupancy sensors provided in places different from each other in the residence, a storage section, and a determination section. The determination section stores, in the storage section in advance, a specific action defined by at least a reaction order of the multiple occupancy sensors. The determination section stores reaction time as reaction data in the storage section when any of the multiple occupancy sensors reacts, extracts a current action based on the reaction data stored in the storage section, and compares the current action with the specific action to determine whether the specific action has been normally performed. By storing the reaction time of each occupancy sensor as reaction data, it is possible to obtain information on from where and to where the monitoring target person has moved, and to appropriately monitor the action of the monitoring target person who moves across multiple areas.

The action monitoring system of the present disclosure may further include a notification section configured to notify information reflecting a determination result of the determination section. In this way, it is possible to prompt the monitoring target person to perform the specific action.

In the action monitoring system of the present disclosure, the specific action may be defined further by any of a timing, a day of the week, a time slot, and a staying time. In this way, it is possible to more accurately define the specific action, and it is possible to accurately determine whether the specific action has been performed. The timing may include a year, a month, a day, and a season.

Furthermore, in the action monitoring system of the present disclosure, the determination section may further extract a standard action based on the reaction data accumulated for a certain period of time in storage section, compare the current action with the standard action to determine whether the standard action has been normally performed, and change the standard action based on a timing change in the reaction data. In this way, even when the action of the monitoring target person changes because of a season factor or the like, it is possible to accurately determine whether the standard action has been performed.

The present disclosure is not limited to a form of an action monitoring system, and may be a form of an action monitoring method.

INDUSTRIAL APPLICABILITY

The present disclosure can be used in a manufacturing industry of an action monitoring system.

REFERENCE SIGNS LIST

10 action monitoring system, 11 network, 20 management server, 21 processing section, 22 communication section, 23 storage section, 30 monitoring device, 31 control section, 32 communication section, 33 operation display section, 34 speaker, 40 sensors, 41 to 47 occupancy sensor, 48 door sensor.

The invention claimed is:

1. An action monitoring system configured to monitor an action of a monitoring target person living in a residence, the action monitoring system comprising:

multiple occupancy sensors provided in places different from each other in the residence, the multiple occupancy sensors being configured to detect the monitoring target person;

a storage section configured to store data; and a determination section configured to;

store, in the storage section in advance, a specific action defined by a reaction order of the multiple occupancy sensors corresponding a movement of the target person among the places that correspond to the respective multiple occupancy sensors and a predetermined execution time of the reaction order corresponding to the specific action, store a reaction time as reaction data in the storage section when any of the multiple occupancy sensors reacts, extract a current action based on the reaction data stored in the storage section by comparing a sequence and a time of the reactions, and compare the current action with the specific action to determine whether the specific action has been performed by comparing the sequence and the time of the reactions to the reaction order and the predetermined execution time.

2. The action monitoring system according to claim 1, further comprising:

a notification section configured to notify information reflecting a determination result of the determination section.

3. The action monitoring system according to claim 1, wherein the specific action is defined further by any of a timing, a day of the week, a time slot, and a staying time.

4. The action monitoring system according to claim 1, wherein the determination section is configured to further extract a standard action based on the reaction data accumulated for a certain period of time in the storage section, compare the current action with the standard action to determine whether the standard action has been performed, and change the standard action based on a timing change in the reaction data.

5. An action monitoring method of monitoring an action of a monitoring target person living in a residence, the action monitoring method comprising:

a detection step of detecting the monitoring target person in places different from each other in the residence using multiple occupancy sensors corresponding to the places;

a first storage step of storing a specific action defined by at least a reaction order in multiple places in the detection step, in advance corresponding a movement of the target person among the places that correspond to respective multiple occupancy sensors and a predetermined execution time of the reaction order corresponding to the specific action;

a second storage step of storing a reaction time as reaction data when there is a reaction in any of the multiple places in the detection step by comparing a sequence and a time of the reactions; and a determination step of extracting a current action based on the reaction data stored in the second storage step and comparing the current action with the specific action to determine whether the specific action has been performed by comparing the sequence and the time of the reactions to the reaction order and the predetermined execution time.

6. The action monitoring system according to claim 1, wherein the multiple occupancy sensors each correspond to a different room in the residence.

7. The action monitoring method according to claim 5, wherein the multiple occupancy sensors each correspond to a different room in the residence.

* * * * *